United States Patent [19] [11] 4,070,895
Yamada et al. [45] Jan. 31, 1978

[54] METHOD FOR MANUFACTURING BOTTOM VALVE SEAT

[75] Inventors: Masami Yamada, Yokosuka; Yuji Soeda, Odawara, both of Japan

[73] Assignee: Tokico Ltd., Kawasaki, Japan

[21] Appl. No.: 721,987

[22] Filed: Sept. 10, 1976

[30] Foreign Application Priority Data

Sept. 20, 1975 Japan .................................. 50-113935
Sept. 20, 1975 Japan .................................. 50-113936

[51] Int. Cl.² ............................................ B21D 53/10
[52] U.S. Cl. ...................................... 72/334; 72/336; 29/156.7 A
[58] Field of Search ................. 72/330, 333, 334, 335, 72/336; 29/156.7 A, 157.1 R

[56] References Cited

U.S. PATENT DOCUMENTS 2,305,064 12/1942 Colwell, et al. ................. 29/156.7 A
3,057,042 10/1962 Lawson ..................................... 72/333
3,785,029 1/1974 McClellan et al. ............. 29/157.1 R Primary Examiner—Lowell A. Larson
Attorney, Agent, or Firm—Schmidt, Johnson, Hovey & Williams

[57] ABSTRACT

A method for manufacturing a bottom valve seat for use in a hydraulic damper is provided including the steps of: punching out a circular blank from a flat plate of a given thickness to prepare a circular blank having given dimensions; drawing the blank into a cup-shaped work having a circumferential flange portion; forming a cylindrical wall in the cup-shaped work thus provided, with the wall having a given length; and pressing the central portion of a bottom portion of the cup-shaped work downwards or internally, thereby forming an annular flat portion along the circumferential edge of the bottom portion; cutting the flange portion into given dimensions; and punching a through hole in the flange portion. In this bottom valve seat, the flange portion has a flat surface and at least one oil passage is provided in the portion of the valve seat, which is opposite to the bottom portion.

7 Claims, 8 Drawing Figures

METHOD FOR MANUFACTURING BOTTOM VALVE SEAT

BACKGROUND OF THE INVENTION

This invention relates to a damper, and more particularly to a method for manufacturing a bottom valve seat for use in a damper, which method includes the steps of: punching out a circular blank from a steel plate having a given thickness by a punching press to prepare a circular blank having given dimensions; drawing the blank into a cup-shaped work having a circumferential flange; further pressing the bottom portion of the cup-shaped work downwards to provide a tapered valve seat surface on the aforesaid bottom portion; and punching a through-hole in the central portion of the bottom portion of the cup-shaped work; thereby providing, according to a press-forming technique, a bottom valve seat provided with a valve seat surface and a through-hole.

FIGS. 1, 2 and 3 show a hydraulic damper, 1 being a cylinder, 2 a piston reciprocable within the cylinder, 3 a slidable piston rod, 4 a bottom valve seat, 5 an outer cylinder surrounding the peripheral surface of the cylinder, 6, 7 upper and lower end covers secured to the outer cylinder, 8 a rod guide adapted to guide the piston rod 3, and 9 a seal packing which seals a through-hole in the upper end cover 6.

When the piston 2 is slidingly lowered within the cylinder 1 so as to effect the stroke of a piston in a hydraulic damper, then oil in lower chamber A under the piston 2 passes through a through-hole 10a in a valve retainer 10, while urging the circumferential edge portion of the valve retainer 10 and the circumferential edge portion of annular double-sheet valve 11 against a valve seat surface 4a of the bottom valve seat 4, and then into a central opening 4b provided in the bottom valve seat 4 as shown by an arrow 20, while deflecting the inner circumferential edge portion of the valve 11. Thereafter, oil passes through oil passages 7a defined by several projections formed on the top surface of the lower end cover 7, and then into a reservoir chamber C as shown by an arrow 21.

Meanwhile, when the piston 2 is lowered, the annular double-sheet valve 24 provided in the piston 2 closes a through-hole 25a in the valve retainer 25, and slides together with the retainer 25 against the force of a spring, so that oil in the chamber A directly flows into the chamber B, without resistance.

When the piston 2 slides upwards within the cylinder 1 so as to extend the stroke of the piston, then oil in the upper chamber B above the piston 2 flows by way of a valve 24 provided in the piston 2, into the chamber A, producing hydraulic resistance, while oil in reservoir chamber C passes through the oil passages 7a provided in the lower end cover 7, as clearly shown by arrows 26, 28 in FIG. 3, and then through a hole 4b in the valve seat 4, thereby pushing the valve 11 and valve retainer 10 upwards against the force of a spring 27. Then, oil passes in between the valve seat surface 4a of the bottom valve seat 4 and the valve 11, then through a gap between the valve 11, valve retainer 10 and the valve guide 12 into the chamber A. In this manner, a difference in timing of oil flows in response to the reciprocating movements of the piston 2 provides a damping action.

With a hydraulic damper of this type, the valve seat 4 plays an important role, so that even a partial failure thereof would lead to a vital damage of the damper itself. In addition, the valve seat 4 is extremely complicated in construction.

For this reason, many attempts have been proposed hitherto so as to provide a high strength valve seat, which can accommodate itself to any complicated shape, and which can be mass produced.

To date, it has been found most suitable to manufacture a valve seat according to a sintering process. FIG. 4 shows an ordinary type valve seat which has been manufactured according to a sintering process.

At the present time, it is a widely accepted practice for the manufacture of a bottom valve seat to use an iron-base sintered material produced by compressing iron powder into a shape and sintering same. This method has been adopted from viewpoints of strength, limitation on the type of materials, and adaptability to forming. However, this sintering process poses another problem. For instance, a sintering process required a complicated step for correcting dimensions of a product by means of a correcting metal die for achieving a desired dimensional accuracy. This is because according to the sintering process, iron powder is placed in a cavity defined by a combination of a several metal dies and compressed to a given density to be shaped. Then it is taken out from the metal dies, and placed in a furnace for heating at 1100° to 1200° C for about 2 to 3 hours for sintering. Then, the dimensions of the workpiece are corrected by using a dimension-correcting metal die. In addition, the iron-base sintered material is vulnerable to impact, so that special care should be taken for manufacture and transportation of the products. Moreover, the iron-base sintered products suffer from an increased error in dimension along its length, as compared with an error in dimension in the diametrical direction. In addition to a complicated process, operations incident to processing of iron powder require considerable expense, thus resulting in a high manufacturing cost.

SUMMARY OF THE INVENTION

It is accordingly an object of the present invention to provide a method for manufacturing a bottom valve seat for use in a damper, which is simple and permits the use of an ordinary type press-machine.

It is another object of the present invention to provide a method for manufacturing a bottom valve seat for use in a damper, which is well adapted for mass production, thereby reducing manufacturing cost and material cost, and presenting strength, dimensional accuracy and which perform well comparable to those of the prior art valve seats, with the accompanying reduction in weight.

According to the present invention, there is provided a method for manufacturing a bottom valve seat for use in a damper, which comprises the steps of: punching out a circular blank having given dimensions from flat plate of a given thickness; drawing said blank into a cup-shaped work having a circumferential flange portion; forming a cylindrical wall in the cup-shaped work thus provided, said wall having a given length; and pressing a central portion of a bottom portion of the cup-shaped work downwards or internally, thereby forming an annular flat portion along the circumferential edge of said bottom portion; cutting said flange portion to given dimensions; and punching a through-hole in said flange portion.

DESCRIPTION OF THE PREFERRED EMBODIMENTS

Figure 5:
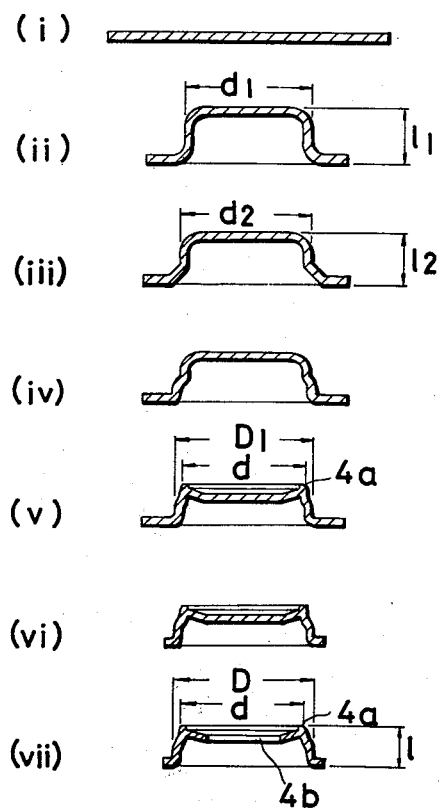
FIG. 5 is a view illustrative of the steps for manufacturing one type of a bottom valve seat according to the method of this invention.

FIG. 5 shows the steps in making an embodiment of the present invention. (i) shows a circular blank having given dimensions that has been punched out from a steel plate having a given thickness by a conventional machine. The blank thus prepared is drawn into a shallow cup shape while the circumferential edge portion of the blank is help in clamps. Step (ii) represents the forming of the blank into the final cup shape having a circumferential flange portion. In step (ii), the outer diameter ($d_1$) of the cup shaped work is larger than the outer diameter ($d$) of the completed work 4, and the height ($l_1$) thereof is greater than the height ($l$) of the latter. Then, pressure is applied to the work from above and below. This provides a desired deflection to the side wall portion of the work, as is shown in step (iii) in which the upper part of the side wall portion is curved and bended into the bottom portion of the work and a lower portion which is angled and bends into the flange portion, so as to provide a flexibility into said side wall portion, although the side wall provided in the step (ii) is straight. At this time, an outer diameter $d_2$ of the side wall of a work presents the relationship of $d_1 > d_2 > d$, while the height presents the relationship of $l_1 > l_2 > l$. According to the step (iv), the work is subjected to a forming operation so as to given a desired contour to the aforesaid angle portion. In other words, the side wall portion of the work is so shaped as to provide an upper curved portion. In the step (v), the work is pressed from above and below, so that the outer diameter of the work is finally defined by using a stepped-outer-diameter finishing die after the step (iv), with the result that different diameter portions having diameters $d$ and D are shaped. In this respect, there is provided (see step v) a right angled circumferential corner between the flange portion and such a portion of the upright side wall having a larger diameter D. As a result, when the valve guide 12 is fitted on the valve seat 4, the bottom and lower inner side wall of the valve guide 12 may be closely fitted on the flange surface and large-diameter portion of the valve seat 4, thereby providing a perfect seal between the valve seat 4 and the valve guide 12. In the step (v), the top surface of the valve seat may be formed simultaneously with forming of the side wall. More particularly, an upper die forms a concave dish-shaped portion in the top surface of the work. This operation has a close bearing on the subsequent operations. According to the valve seat 4 of the invention, a valve seat surface 4a is provided on the circumferential edge of the valve seat 4 in the same manner as a prior art valve seat. However, according to the present invention, a flat, double-sheet valve-supporting surface is provided on the top circumferential edge of the surface 4a. The aforesaid supporting surface is provided with a given curvature along its inner circumferential edge, thereby extending the service life of the double-sheet valve. This is because the aforesaid double-sheet valve may be satisfactorily supported by the aforesaid supporting surface, when the double-sheet valve is actuated.

Referring to the step (v), an annular cavity having a given depth is provided in an upper die. When a blank is pressed into the aforesaid annular cavity in the upper die, the blank is pressed against the circumferential edge of the cavity, so that a desired annular flat portion is formed on the top surface of a work. This annular flat portion is positioned at a right angle to the side wall of the work, which has a smaller diameter. According to the step (v), there may be formed a side wall, a flat, double-sheet valve-supporting surface, and an top surface having a central concave portion.

The step (vi) shows the work after the flange portion has been trimmed to desired dimensions.

According to step (vii), an opening 4b is defined in the top concave portion of the top surface of the valve seat 4. The above opening 4b is prepared by a known machine with ease and provides a passage for oil to pass through the valve seat 4.

Meanwhile, it should be understood that the aforesaid steps for forming a valve seat are only illustrative of the present invention, and thus the present invention is by no means limited to these steps. In other words, forming of the opening 4b is carried out in the final step. However, this operation may be carried out together with the blank punching out operation of the first step.

Alternatively, the punching operation in FIG. 5 (step vi) may be conducted in conjunction with one of the steps prior thereto.

Figure 1:
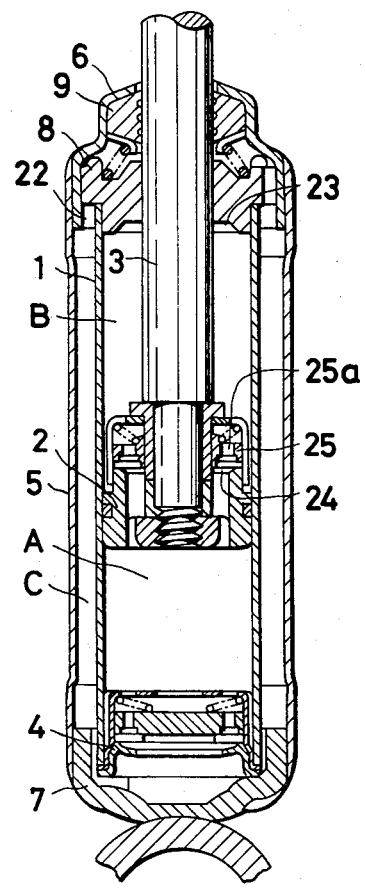
FIG. 1 is a longitudinal cross-sectional view of a damper including a valve seat manufactured according to the method of the invention.
Figure 2:
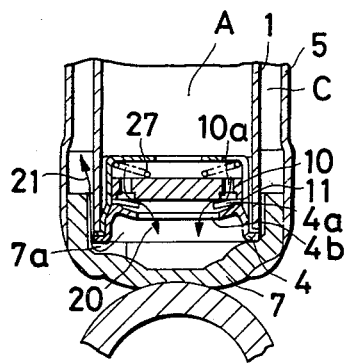
FIGS. 2 and 3 are views of part of the damper, illustrating the flow paths of fluid in the bottom portion of the damper.
Figure 4:
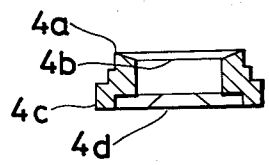
FIG. 4 is a cross-sectional view of a valve seat of the prior art.
Figure 3:
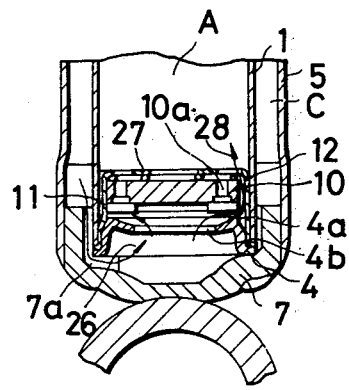
Figure 6:
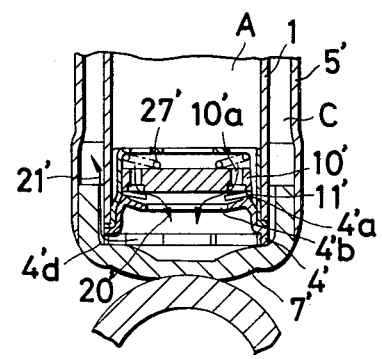
FIGS. 6 and 7 are views illustrative of parts of the damper, showing the flow paths of fluid in the bottom portions of the damper.
Figure 7:
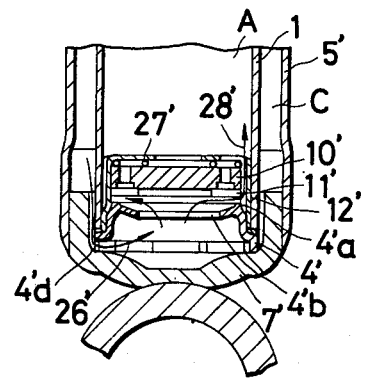

FIGS. 6 and 7 show another embodiment of the bottom valve seat, in which unlike the lower end cover 7 having projections which define fluid passages 7a, as shown in FIGS. 1 to 3, fluid passages 4'd are defined within a valve seat 4' itself. In this case as well, the flow of fluid and operations of the other members are the same as those described in connection with the preceding embodiment. Referring to FIG. 1, when the piston is slidingly lowered within the cylinder 1 so as to compress a stroke of the piston is a hydraulic damper, then oil in an lower chamber A under the piston 2 passes through a through-hole 10'a provided in a valve retainer 10', while pressing the circumferential edge portion of the valve retainer 10' and the circumferential edge portion of the double-sheet valve 11' against a valve seat surface 4'a of a bottom valve seat 4', and then into a central opening 4'b in the bottom valve seat 4' as shown by an arrow 20', while deflecting the inner circumferential edge portion of the valve 11' downwards. Then, oil passes through an oil passage 4'd defined by several projections formed on the bottom portion of the bottom valve seat 4', into a reservoir chamber C, as shown by an arrow 21'.

Meanwhile, when the piston 2 is moved downwards, an annular double-sheet valve 24 provided in the piston 2 serves as a check valve adapted to close a through-hole 25a in the valve retainer 25, thereby interrupting the flow of oil from the chamber A into the chamber B directly. However, after the internal pressures in chambers A and C are brought into equilibrium and become higher than that of the chamber B, when a valve 24 provided above the piston 2 is moved upwards against an action of a spring provided between the valve guide and the retainer 25, so that an opening provided in the valve guide is opened, thus permitting oil in the chambers A and C to flow through the aforesaid opening and a passage defined between the peripheral surface of the valve guide and the inner peripheral surface of the cylinder 1 into the chamber B without resistance. This phenomenon is known to those skilled in the art.

When the piston is slidingly moved upwards within the cylinder 1 so as to extend the stroke of the piston in the damper, then oil in the upper chamber B above the piston 2 flows by way of a valve 24 provided in the piston 2, into the chamber A, thereby producing a hydraulic resistance, while oil in the reservoir chamber C passes through an oil passage 4'd in the bottom valve seat 4' as shown by arrows 26' and 28' in FIG. 7, thereby lifting the valve 11' and valve retainer 10' against the force of a spring 27'. A difference in timing of flows of oil which is responsive to the reciprocating movements of the piston 2 may provide a damping action.

Figure 8:
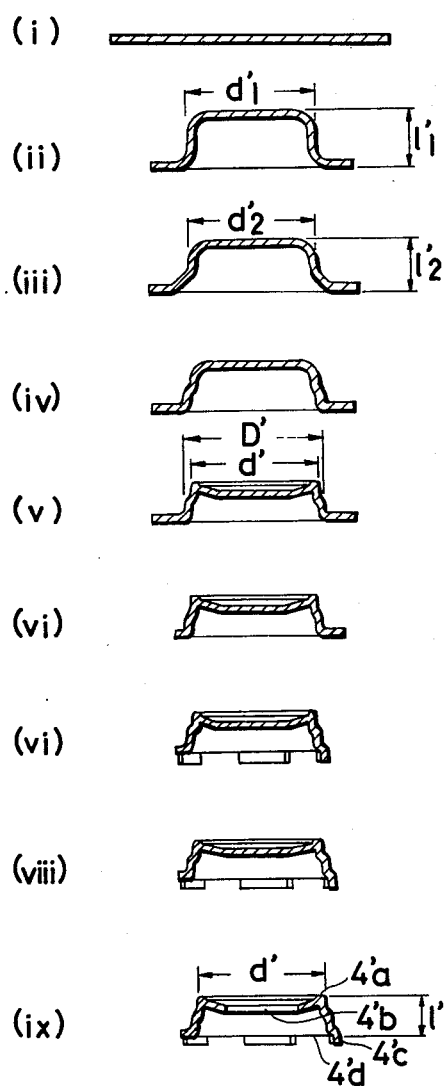
FIG. 8 is a view illustrative of the steps of a method for manufacturing another type of bottom valve seat according to the invention.

FIG. 8 shows the steps of manufacturing a bottom valve seat according to the present invention. Step (i) in FIG. 8 shows a circular blank punched out from a steel plate having a given thickness into a circular blank of given dimensions. The step (ii) shows the blank after being drawn into a cup shape having a circumferential flange portion. In step (iii) pressure is applied to the cup-shaped work from above and below. Step (iv) refers to a pre-forming, and step (v) to forming of a top surface of the valve seat, simultaneously with forming of the side wall thereof. These steps are substantially the same as steps (i) to (v) in FIG. 5.

Step (vi) in FIG. 8 shows the flange portion after being cut to desired dimensions. In this step, part of the flange portion is cut into an arcuate shape having a given length, thereby defining an oil passage for a leg portion of the valve.

The step (vii) refers to bending of the remaining portion of the flange portion downwards.

The step (viii) refers to forming of a right-angled corner portion defined between a bent portion of the flange portion and a large diameter portion of the side wall. In this case, if a work is press-formed so as to give a desired width for the flange portion, then the corner may be formed in the same manner as in the case of forming of the supporting surface providing in the step (v).

The step (ix) refers to punching an opening 4'b having a given diameter in a concave central portion of the top surface of the valve seat 4'. The punching of the opening 4'b may be carried out by known means. The opening 4'b provides a passage for permitting oil to pass through the valve seat 4'.

Meanwhile, the aforesaid method for forming a valve seat is provided only for an illustrative purpose, and thus the present invention is not limited to these steps. For instance, the punching of the opening 4'b is carried out in the final step of the method, while this punching may be given together with the cutting of a blank in the first step.

Like the case in FIG. 5, the punching step (vi) may be carried out in conjunction with a suitable prior step.

The method for manufacturing the valve seat according to the present invention may be accomplished with ease, and an ordinary type press-machine may be used, and thus is well adapted for a mass production of bottom valve seats. In addition, the method according to the present invention may present valve seats at a low manufacturing cost and of desired strength and dimensional accuracy and performance, which are well comparable to the prior art valve seats, with an accompanying reduction in weight.

What is claimed is:

1. A method for manufacturing a bottom valve seat for use in a hydraulic damper, in which projections defining fluid passages are provided on a lower end cover thereof, comprising the steps of:
    punching out a circular blank from a flat plate of a given thickness into a circular blank having given dimensions;
    drawing said blank into a cup-shape having a circumferential flange portion;
    forming a cylindrical wall for the cup-shaped work thus provided, said wall having a given length;
    pressing the central portion of the bottom portion of said cup-shaped work downwards or internally, thereby forming an annular flat portion along the circumferential edge of said bottom portion;
    cutting said flange portion to desired dimensions; and
    after said forming and pressing steps, punching a through-hole in the bottom portion of said cup-shaped work;
    said flange portion being thereby formed to have a flat surface on the side opposite the bottom portion thereof, and said annular flat portion of said bottom portion being thereby formed to have a curvature along its inner circumferential edge for supporting a double-sheet valve.

2. A method for manufacturing a bottom valve seat including the steps as set forth in claim 1, wherein the step of punching a through-hole in the bottom portion of said cup-shaped work is done after the step of cutting said flange portion to desired dimensions.

3. A method for manufacturing a bottom valve seat including the steps as set forth in claim 1, wherein the step of punching a through-hole in the bottom portion of said cup-shaped work is done before the step of cutting said flange portion to desired dimensions.

4. A method for manufacturing a bottom valve seat for use in a hydraulic damper, in which projections defining fluid passages are not provided on a lower end cover thereof, comprising the steps of:
    punching out a circular blank from a flat plate having a given thickness;
    drawing said blank into a cup shape having a circumferential flange portion;
    forming a cylindrical wall portion of a given length for said cup-shaped work, said wall portion having a given length;
    pressing the bottom portion of said cup-shaped work internally to thereby form an annular flat portion along the circumferential edge of said bottom portion;
    cutting at least part of said flange portion;
    bending said flange portion to provide a leg portion;
    after said forming and pressing steps, punching a through-hole in the bottom portion of said cup-shaped work;
    said valve seat being thereby formed to provide at least one fluid passage on the side opposite to the bottom portion of said cup-shaped work, and said annular flat portion being thereby formed to have a curvature along its inner circumferential edge for supporting a double-sheet valve.

5. A method for manufacturing a bottom valve seat including the steps as set forth in claim 4, wherein the step of punching a through-hole in the bottom portion of said cup-shaped work is done in the last step of this method.

6. A method for manufacturing a bottom valve seat including the steps as set forth in claim 4, wherein the step of punching a through-hole in the bottom portion of said cup-shaped work is done immediately after the step of pressing the bottom portion to form the annular flat portion of said bottom portion.

7. A method for manufacturing a bottom valve seat including the steps as set forth in claim 4, wherein the step of punching a through-hole in the bottom portion of said cup-shaped work is done after the step of cutting at least part of said flange portion.

* * * * *